United States Patent [19]

Swain et al.

[11] Patent Number: 5,549,999
[45] Date of Patent: Aug. 27, 1996

[54] PROCESS FOR COATING BELT SEAMS

[75] Inventors: Eugene A. Swain; John J. Darcy, both of Webster, N.Y.

[73] Assignee: Xerox Corporation, Stamford, Conn.

[21] Appl. No.: 634,365

[22] Filed: Dec. 27, 1990

[51] Int. Cl.[6] .............. G03G 5/00; B05D 1/36; B65H 69/02; B32B 31/20
[52] U.S. Cl. .............. 430/127; 427/296; 427/258; 427/275; 427/384; 427/393.5; 427/412.1; 427/498; 427/512; 156/158; 156/275.1; 156/304.5; 156/308.4
[58] Field of Search .............. 428/57, 58, 64, 428/35.8, 61, 35.4; 430/56, 62, 127; 355/212; 156/158, 275.1, 304.5, 308.4; 427/121, 282, 296, 393.5, 412.1, 600

[56] References Cited

U.S. PATENT DOCUMENTS

| | | | |
|---|---|---|---|
| 3,357,989 | 12/1967 | Byrne et al. | 260/314.5 |
| 3,442,781 | 5/1969 | Weinberger | 204/181 |
| 3,546,054 | 12/1970 | Ross | 161/38 |
| 4,092,173 | 5/1978 | Novak et al. | 96/119 R |
| 4,187,407 | 2/1980 | Marko, Jr. | 219/91.2 |
| 4,233,384 | 11/1980 | Turner et al. | 430/59 |
| 4,265,990 | 5/1981 | Stolka et al. | 430/59 |
| 4,286,033 | 8/1981 | Neyhart et al. | 430/58 |
| 4,291,110 | 9/1981 | Lee | 430/59 |
| 4,299,897 | 11/1981 | Stolka et al. | 430/59 |
| 4,306,008 | 12/1981 | Pai et al. | 430/59 |
| 4,333,998 | 6/1982 | Leszyk | 430/12 |
| 4,338,387 | 7/1982 | Hewitt | 430/58 |
| 4,362,799 | 12/1982 | Kondo et al. | 430/67 |
| 4,363,858 | 12/1982 | Vercoulen | 430/56 |
| 4,415,639 | 11/1983 | Horgan | 430/57 |
| 4,426,431 | 1/1984 | Harasta et al. | 430/14 |
| 4,439,507 | 3/1984 | Pan et al. | 430/59 |
| 4,472,491 | 9/1984 | Wiedemann | 430/58 |
| 4,477,548 | 10/1984 | Harasta et al. | 430/14 |
| 4,532,166 | 7/1985 | Thomsen et al. | 428/57 |
| 4,626,391 | 12/1986 | Taylor | 264/46.6 |
| 4,758,486 | 7/1988 | Yamazaki et al. | 430/56 |
| 4,838,964 | 6/1989 | Thomsen et al. | 156/73.1 |
| 4,959,109 | 9/1990 | Swain et al. | 156/73.4 |

Primary Examiner—George F. Lesmes
Assistant Examiner—Bernard P. Codd

[57] ABSTRACT

Process for coating flexible belt seams including providing a flexible belt having an outwardly facing surface and a welded seam, forming a smooth liquid coating comprising a hardenable film forming polymer on the welded seam, the coating being substantially free of fugitive solvent, and hardening the coating to form a smooth solid coating on the seam.

4 Claims, 2 Drawing Sheets

PROCESS FOR COATING BELT SEAMS

BACKGROUND OF THE INVENTION

This invention relates in general to a process for coating seamed belts and more specifically to a process for coating belt seams with hardenable coatings containing film forming polymers.

Various techniques have been devised for joining belts such as photoreceptor belts. Belts may be joined in manufacture by overlapping the edge of one end of a sheet over the other opposite edge of the sheet thus forming a lap joint or seamed region that is thereafter welded. The technique of joining thermoplastic belted materials is well known and illustrated, for example, in U.S. Pat. Nos. 4,838,964 and 4,959,109, both of these patents being incorporated by reference herein in their entirety.

Acceptable joints formed in the aforementioned joining process for belt shaped electrophotographic imaging members perform satisfactorily when transported around relatively large diameter rollers. The lap joints or seams of these belts contain a deposit of web material melted during joining. These deposits or "weld splashes" are formed on each side of the welded web adjacent to and adhering to each end of the original web and to the regions of the web underlying each splash. Unfortunately, when the belts are transported around very small diameter rollers having, for example a diameter of about 19 mm or less, the weld splash on the outer surface of the belt gradually separates from the upper end of the photoreceptor web during cycling to form an open crevasse or crack which is repeatedly struck by conventional cleaning blades during image cycling to cause the weld splash on the outer surface of the belt to also separate from the underlying web so that it is held to the belt at a small linear region located along the length of the splash on the side of the splash opposite the upper end of the photoreceptor web. This small linear region located along the length of the splash on the side of the splash opposite the upper end of the photoreceptor web functions as a hinge that allows the weld splash to pivot or flop away from the upper end of the photoreceptor web and from the underlying web so that carrier beads and toner particles or liquid ink developer collected in the space between the web and splash are periodically ejected when the splash flops open and closed when the seam passes the cleaning blade and also when it travels around small diameter rollers. The ejected materials float to various subassemblies (e.g. corotrons, lamps) and causes them to fail or perform poorly and ultimately cause copy defects. Collisions of the blade with the flopping splash also result in the blade becoming chipped and pitted. These chips and pits in the blade leave streaks of toner or liquid ink on the photoreceptor surface which eventually appear as streaks on copies made during subsequent electrophotographic imaging cycles and adversely affect image quality.

Thus, problems encountered with belt-type photoreceptors having a seam include repeated striking of the seam by cleaning blades. This causes toner developer or liquid ink agglomerates to form that are trapped at the irregular surface of the seam. Belted photoreceptors also tend to delaminate at the seam when the seam is subjected to constant battering by the cleaning blade. Plus, collisions between the cleaning blade and seam damage the blade thereby shortening blade and photoreceptor life and degrading copy quality.

If a photoreceptor seam is coated with a solution of a resinous coating material dissolved in a suitable solvent and heated or placed in a vacuum to accelerate the removal of the solvent, the incipient photoreceptor seam coating can undergo substantial redistribution and deformation resulting, for example, in non-uniform defects such as creasing, wrinkling, cracking, blisters and the like due to solvent attack of components in the photoreceptor. Moreover, during the use of solution based coating techniques, the solvent can attack one or more layers of the photoreceptor belt and cause significant damage or complete destruction of the functional properties of the photoreceptor belt such as the flexibility, structural strength, or the imaging characteristics of the belt.

INFORMATION DISCLOSURE STATEMENT

In U.S. Pat. No. 4,472,491 to Wiedemann, issued Sep. 18, 1984—An ultraviolet radiation-cured protective layer comprising an acrylated binder is disclosed. The protective layer materials include an acrylated polyurethane, an acrylated polyester and an acrylated epoxide resin. Suitable curing is provided by radiation sources with electrical outputs of 100 W/cm (e.g. see column 4, lines 38–42).

In U.S. Pat. No. 4,092,173 to Novak et al, issued May 30, 1978, and U.S. Pat. No. 4,333,998 to Leszyk, issued June 8, 1982—Radiation curable compositions comprising an acrylated urethane, an aliphatic ethylenically-unsaturated carboxylic acid and a multifunctional acrylate are disclosed. The composition in U.S. Pat. No. 4,333,998 additionally includes a siloxy-containing polycarbinol.

In U.S. Pat. No. 4,362,799 to Kondo et al, issued December 7, 1982—An image holding member comprising a thermal or radiation curable epoxyacrylate resin insulating layer is disclosed. An object of the invention is to provide a surface that has good cleaning properties (e.g. see column 2, lines 57–62).

In U.S. Pat. No. 4,426,431 issued January 17, 1984 and U.S. Pat. No. 4,477,548 issued Oct. 16, 1984 to Harasta et al—Radiation curable protective compositions are disclosed. In U.S. Pat. No. 4,426,431, the coating comprises polymerizable epoxy, acrylic and silane compounds. In U.S. Pat. No. 4,477,548, the coating composition includes a multifunctional acrylate of formula (III) (e.g. see column 12, lines 55–59).

While some of the above described members exhibit certain desirable properties such as providing restorative and/or protective treatment of surfaces, there continues to be a need for improved seamed belts, particularly in electrostatographic imaging systems utilizing blade cleaning. When ultrasonic welding techniques are utilized to fabricate belts having welded seams, particularly photoreceptors in electrostatographic copiers, duplicators, printers and the like that are transported over small diameter rollers, copy quality can deteriorate when blade cleaning is used during image cycling. Thus, there remains a need to provide electrophotographic imaging members having seam enhanced durability which allows for extended photoreceptor life. Also, a need exists for photoreceptor imaging members having improved copy quality and reliability. The application of a uniform coating over the entire surface of a photoreceptor web prior to cutting and welding does not improve the performance of a welded seam. The application of an overcoating over the entire outer surface of a flexible photoreceptor belt subsequent to cutting and welding is extremely difficult and time consuming because of the thickness tolerances required to ensure uniform electrical imaging properties.

SUMMARY OF THE INVENTION

It is an object of this invention to provide a seam coating process which overcomes the above-noted disadvantages.

It is another object of this invention to provide a seamed coating process which forms coated seams that avoid weld splash separation when cycled over small diameter rollers.

It is still another object of this invention to provide a seamed coating process for fabricating belted photoreceptors which minimizes the formation of streaks on copies.

It is another object of this invention to provide a seam coating process which increases belt seam life.

It is still another object of this invention to provide a seam coating process which extends the useful life of belted photoreceptors.

It is yet another object of this invention to provide a seam coating process which provides for a smooth transition for a cleaning blade to follow while it moves over a photoreceptor seam and thereby increasing the useful life of cleaning blade members.

It is another object of this invention to provide a seam coating process for seamed photoreceptors which fills voids and non-uniformities in the seam so as not to trap liquid ink or dry toner and carry it into the next machine cycle.

It is still another object of this invention to provide a seam coating process for seamed photoreceptors which is an economical and practical method for conditioning seamed photoreceptors.

The foregoing objects and others are accomplished in accordance with this invention by providing a process for coating flexible belt seams comprising providing a flexible belt having an outwardly facing surface and a welded seam, forming a smooth liquid coating comprising a hardenable film forming polymer on the welded seam, the coating being substantially free of fugitive solvent, and hardening the coating to form a smooth solid coating on the seam.

The advantages of the coated seam belts will become apparent upon consideration of the following disclosure of the invention, particularly when taken in conjunction with the accompanying drawings.

BRIEF DESCRIPTION OF THE DRAWINGS

A more complete understanding of the seam coating process and apparatus of the present invention can be obtained by reference to the accompanying drawings wherein.

These figures merely schematically illustrate the invention and are not intended to indicate relative size and dimensions of the belt, components thereof or means to fabricate the belt. For illustrative purposes, most of the following discussion is with specific reference to photoreceptors although the process of this invention is applicable to other types of seamed flexible belts.

Figure 1:
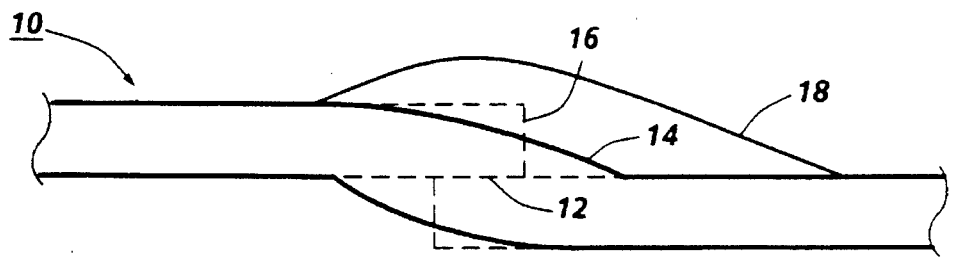
FIG. 1 is a schematic, sectional view in elevation of a coated and welded lap joint seamed belt.

Referring to FIG. 1, the overlapping ends of flexible photoreceptor 10 form the lap joint or seam 12 which when welded forms the seam weld 14. A seam coating 18 may be applied by any suitable technique over the seam weld 14. The coating 18 is initially applied as a thick layer at the point where the surface irregularity on the photoreceptor seam weld 14 is greatest, for example, near the centerline where the belt ends 16 overlap (represented by phantom lines), forming the uniformly smooth seam coating 18.

Figure 2:
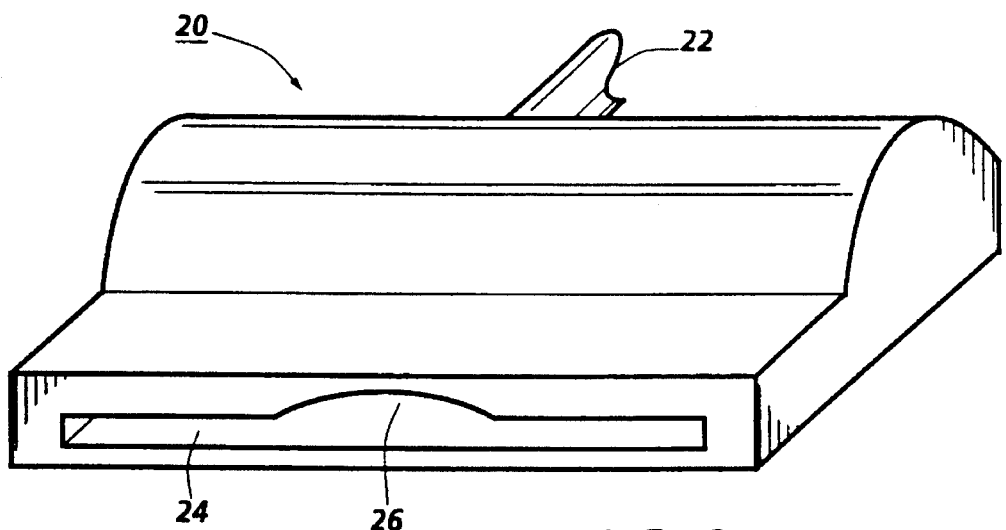
FIG. 2 is a schematic isometric view of an extrusion die means for coating belt seams.

Referring to FIG. 2, a thicker coating at the point of maximum seam weld irregularity may be achieved by an extrusion die 20 which has a feed inlet 22 for controlled delivery of the coating composition to the die 20 and extrusion slot discharge opening 24 which is relatively small at each end of the extrusion slot but is relatively large in the center 26. Alternatively, multiple extrusion die nozzles may be used to apply the coating with the flow of coating material being greater in the nozzles located immediately above the at the point where the surface irregularity on the photoreceptor seam weld 14 is greatest and diminishing at each direction away from the center of the seam weld 14. This allows a ribbon of the coating material having a thicker central region to fill in the large gap at the upper web end and feather by flow at each edge.

Figure 3:
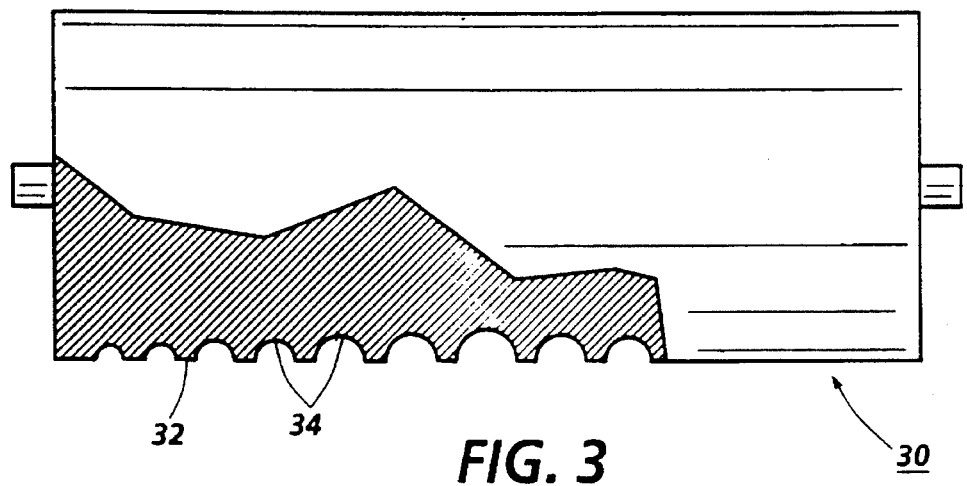
FIG. 3 is a schematic, partial sectional view in elevation of a serrated roller applicator means for coating belt seams.

Alternatively, as shown in FIG. 3, the coating material may be applied with a pitted or serrated roller-type applicator 30 where the lands 32 separate the cells 34. The cells 34 that carry the coating material are deeper at the region opposite the seam 14, e.g. the center of the roller applicator 30 and shallower towards the ends or edges of the serrated roller applicator. The cells 34 may be dimple-like depressions or circumferential grooves.

Figure 4:
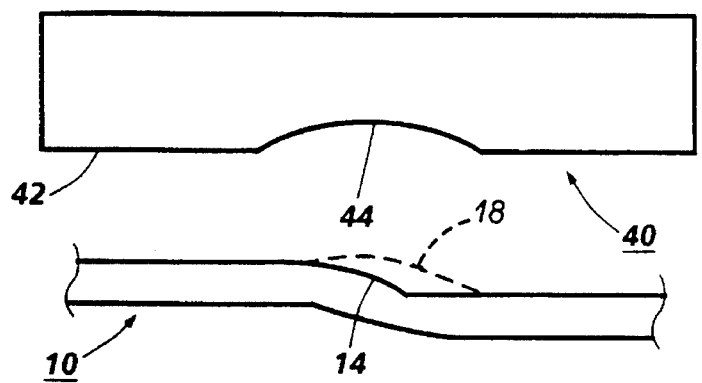
FIG. 4 is a schematic, sectional view in elevation of a blade applicator means for coating belt seams.

Similarly, referring to FIG. 4, a blade applicator 40 may be used where the distance from the blade 40 to the surface of the photoreceptor 10 is smaller or in contact at each end 42 of the blade applicator 40 and is larger at 44 which corresponds to the center of the seam 14.

Figure 5:
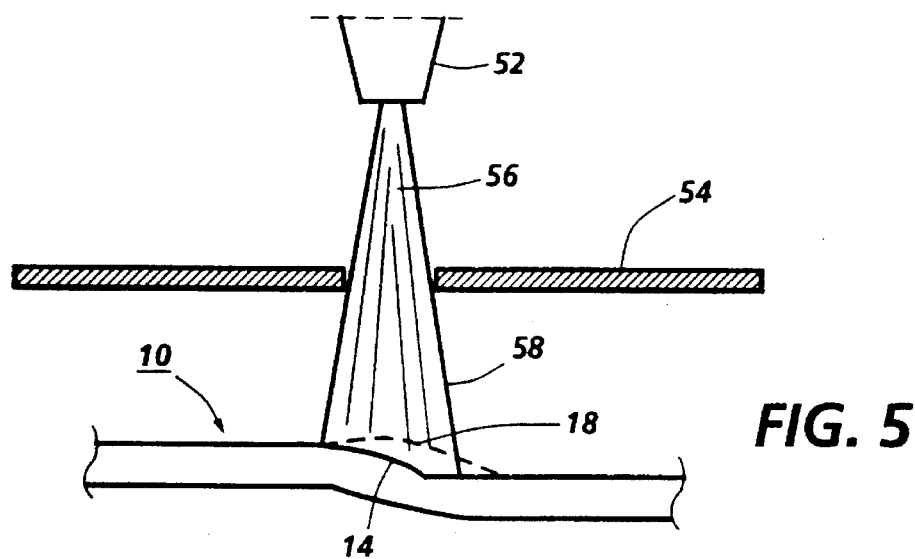
FIG. 5 is a schematic, sectional view in elevation of a spray coating applicator means for coating belt seams.

The seam may also be traversed by a spray applicator 52, as shown in FIG. 5, where the mask 54 contacts and restricts the coating spray 56 and allows the edges of the spray pattern 58 to form a thinner seam coating 18 at the edges due to feathering and a denser and thicker coating in the center of the seam 14 of the seamed photoreceptor 10.

Figure 6:
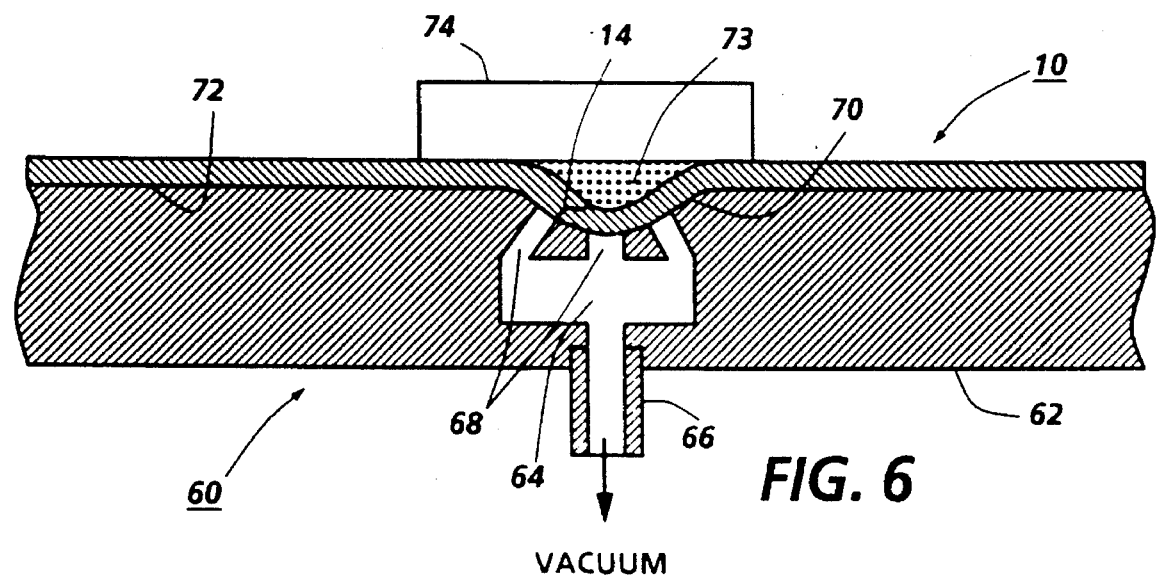
FIG. 6 is a schematic, sectional view in elevation of a blade applicator coating applicator means and vacuum platen for coating belt seams.

Referring to FIG. 6, a vacuum platen arm 60 is shown comprising a metal housing 62 enclosing a vacuum plenum 64 to which are connected a vacuum feed line 66 and vacuum apertures 68. Vacuum apertures 68 may be of any suitable shape such as a rectangular, round, oval, and the like. Vacuum apertures 68 lead from plenum 64 to a trough 70 on the upper surface 72 of arm 60. Supported on the upper surface 72 of arm 60 is a photoreceptor 10 having a seam weld 14. Trough 70 is at least as long as the length of seam weld 14. By supplying a partial vacuum to vacuum plenum 64 through vacuum feed line 66, seam weld 14 is drawn into trough 70 and acquires a shallow "U" shaped cross-sectional shape. A sufficient number of apertures 68 are distributed along the length of trough 70 to ensure that the entire length of seam weld 14 is drawn into trough 70. Next, a pool of hardenable liquid coating material 73 is formed in the "U" shaped portion of photoreceptor 10. A doctor blade 74 is thereafter drawn over photoreceptor 10 in a direction parallel to seam weld 14 to level coating material 72 prior to curing. The coating material 72 is then solidified. If desired, at least the ends (not shown) of trough 70 may be coated with a release coating such as silicone or Teflon to prevent any excess seam coating material from adhering to upper surface 72 of arm 60. The coating material 72 may optionally be partially hardened to a non flowable state while in the trough 70 and finally hardened after photoreceptor 10 is removed from trough 70 and flattened.

Thus, the process of this invention involves a coating technique that fills in the irregularities and defects of a flexible belt seam thereby providing a uniformly smooth seam region which is durable, does not trap debris such as paper fibers or developer materials, or cause damage to contacting objects such as a cleaning blade.

Any suitable thin, flexible web comprising a weldable thermoplastic metallic or thermoplastic polymer layer may be used in the process of this invention. The web may comprise a single layer or a plurality of layers in which at least one of the layers comprises thermoplastic material. Any suitable thermoplastic material which will melt at the temperatures generated at the contiguous overlapping web surfaces of the seam may be utilized. Typical flexible metallic layers include nickel, brass, stainless steel, copper, aluminum, zirconium, niobium, tantalum, vanadium and hafnium, titanium, chromium, tungsten, molybdenum, and the like. Typical thermoplastic, polymeric materials include polyethylenes, polypropylenes, polycarbonates, polyvinylacetate, terephthalic acid resins, polyvinylchloride, styrene-butadiene copolymers and the like.

A preferred seamed belt is a flexible electrostatographic belt imaging member. Flexible belt imaging members are well known in the art. Typical electrostatographic flexible belt imaging members include, for example, photoreceptors for electrophotographic imaging systems and electroceptors or ionographic members for electrographic imaging systems.

Electrostatographic flexible belt imaging members may be prepared by any suitable technique. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto the blocking layer and a charge transport layer is formed on the charge generation layer. For ionographic imaging members, an electrically insulating dielectric layer is applied to the electrically conductive surface.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of an endless flexible belt.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. The conductive layer need not be limited to metals. Other examples of conductive layers include combinations of materials such as conductive indium tin oxide conductive carbon black dispersed in a plastic binder.

After formation of an electrically conductive surface, a hole blocking layer may be applied thereto. Any suitable blocking layer capable of forming an electronic barrier to charges such as holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. No. 4,291,110, U.S. Pat. No. 4,338,387, U.S. Pat. No. 4,286,033 and U.S. Pat. No. 4,291,110. The disclosures of U.S. Pat. No. 4,338,387, U.S. Pat. No. 4,286,033 and U.S. Pat. No. 4,291,110 are incorporated herein in their entirety. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, polyurethanes, and the like. Satisfactory results may be achieved with adhesive layer thickness between about 0.05 micrometer and about 0.3 micrometer.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diaminotriazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in resinous binder compositions in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport charge employed in one of the two electrically operative layers in a multilayered photoconductor comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises a charge transporting aromatic amine compound capable of supporting the injection of photogenerated holes of a charge generating layer and transporting the holes through the charge transport layer such as triphenylmethane, bis(4-diethylamine-2-methylphenyl)phenylmethane; 4'-4"-bis(diethylamino)-2',2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-( 1,1'-biphenyl)-4,4'-diamine, and the like dispersed in an inactive resin binder.

Any suitable inactive resin binder soluble in methylene chloride or other suitable solvent may be employed in the process of this invention. Typical inactive resin binders soluble in methylene chloride include polycarbonate resin, polyester, polyarylate, polyacrylate, polyether, polysulfone, and the like. Generally, the thickness of the transport layer is between about 10 to about 50 micrometers, but thicknesses outside this range can also be used. The transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. No. 4,265,990, U.S. Pat. No. 4,233,384, U.S. Pat. No. 4,306,008, U.S. Pat. No. 4,299,897 and U.S. Pat. No. 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Other layers may be utilized such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground strips are well known and comprise usually comprise conductive particles dispersed in a film forming binder.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semiconductive. They are also continuous and generally have a thickness of less than about 10 micrometers. A typical overcoating is described in U.S. Pat. No. 4,515,882, the entire disclosure of which is incorporated herein by reference. The thickness of anti-curl backing layers should be sufficient to substantially balance the total forces of the layer or layers on the opposite side of the supporting substrate layer and typically is between about 70 and about 160 micrometers.

For electrographic imaging members, a flexible dielectric layer overlying the conductive layer may be substituted for the photoconductive layers. Any suitable, conventional, flexible, electrically insulating dielectric polymer may be used in the dielectric layer of the electrographic imaging member. If desired, the flexible belts of this invention may be used for other purposes where cycling durability is important.

Generally, electrostatographic imaging members are fabricated from webs by cutting the webs into rectangular sheets, overlapping a small segment of opposite edges of each sheet to form a loop and securing the overlapping edges of the sheet together to form a narrow seam. The overlapped edges of the sheet may be secured to each other by any suitable technique such as ultrasonic welding and the like. Any suitable seam overlap may be utilized. A preferred range of overlap is between about 0.7 millimeter and about 0.5 millimeters. The preparation of welded belts is well known and disclosed, for example, in U.S. Pat. No. 4,532,166 and U.S. Pat. No. 4,838,964. The disclosures of these patents are incorporated herein in their entirety.

Any suitable hardenable film forming polymer composition substantially free of fugitive solvent may be utilized to coat the belt seam. The expression "fugitive solvent" as employed herein is defined as solvents or other liquids that evaporate and leave the coating composition after the coating has been deposited. Liquid solvents in contact with the photoreceptor surface can cause undesirable deformation, blistering and the like of the photoreceptor surfaces. However, solvent may be present in the coating composition to facilitate application such as in a spray gun reservoir so long as it evaporates or flashes off before the coating composition contacts the surface of the photoreceptor. In other words, substantially no fugitive solvent is present in the coating composition once it contacts the photoreceptor surface. Also, the coating should be free of any components which dissolve or otherwise adversely affect any components in the underlying belt.

Radiation curable coating compositions may be utilized as seam coating materials. The expression "curable" as used herein is defined as one hardenable by polymerization. Typical curable compositions include radiation curable compositions that may be solidified by exposure to radiation such as ultraviolet light, electron beams, microwaves, X-ray and the like. The radiation curable coating material can be a meltable composition. The coating material may instead be a thermoplastic material which can be applied in a molten state. The temperature of the molten coating material during application should be less than the deformation temperature of the belt being coated. The film forming polymer may be in the form of a pre-polymer, a partially cross-linked polymer, a crosslinkable material admixed with a high temperature catalyst which is triggered by activating radiation, a linear polymer or copolymer and the like. The preferred coating mixture is an ultraviolet light curable polymer because of the higher speed of solidification and curing achieved with little generation of heat. Ultraviolet curing is usually conducted at a radiation frequency between about 200 nanometers and about 400 nanometers. Excessive application of heat can adversely affect the properties of heat sensitive photoreceptors.

The film forming composition should be capable of being applied in a fluid state and thereafter solidified after application. Thus, for example, a thermoplastic polymer that can be melted for application onto the seam and thereafter solidified by radiation curing and cooling may be used. Moreover, compositions that may be polymerized or cross-linked at low temperatures by suitable techniques such as low temperature photo-initiatable catalysts may also be used. The seam coating material should also be flexible, continuous, film forming, resilient, stable, nonreactive when cured, non-tacky, resistant to cracking and adhere well to the substrate. The film forming polymers should wet the surface of the belt during application. More specifically, the surface energy of the belt and seam surface to be coated should exceed the surface energy of the film forming polymer by at least about 30 percent based on the surface energy of the polymeric coating. The angle of incidence of the coating material on the surface of the substrate to be coated should be acute.

The radiation curable film forming polymer may be any suitable rubber or resin. Typical radiation curable film forming polymers include epoxyacrylate resins such as those disclosed in U.S. Pat. No. 4,362,799 which contain, as polymerization unit, bisphenol A diglycidyl ether diacrylate of the general formula:

$$CH_2=C-C-C-(CH_2-CH-CH_2-O-\langle\bigcirc\rangle-C-\langle\bigcirc\rangle-O)-CH_2-CH-CH_2-O-C-C=CH_2$$

with substituents R, O, OH on the left side; CH$_3$, CH$_3$ on the center; OH, O, R on the right.

wherein, n=1–3 and R is H or alkyl.

This curable epoxyacrylate resin may contain other polymerization unit monomers. Examples of such monomers include polyfunctional acrylic monomers such as propylene glycol diacrylate, trimethylolpropane triacrylate, hexanediol diacrylate, ethylene glycol diacrylate and diethylene glycol diacrylate; and methacrylic monomers corresponding to those acrylates. Addition of the above-mentioned polyfunctional acrylic monomer gives a more desirable curable epoxyacrylate resin with respect to curing (curing time and hardness). To accelerate the curing of the epoxyacrylate resin, if necessary, a suitable curing agent such as alkyl anthraquinone, dibenzoyl, benzophenone and benzoin alkyl ether may be added. Typical alkyl anthraquinones include 2-methyl anthraquinone, 2-ethyl anthraquinone and 2-hexyl anthraquinone. The curing agent is generally used in an amount of 1 to 5 parts by weight, in particular, 2 to 3 parts by weight per 100 parts of curable epoxyacrylate resin. If desired, leveling agents such as from 0.01 to 3 weight percent of a dimethlpolysiloxane may be added. The entire disclosure of U.S. Pat. No. 4,362,799 is incorporated herein by reference.

Other examples of a radiation curable polymerizable material include acrylated polymers such as acrylated polyurethanes, acrylated polyesters or acrylated epoxide resins containing a reactive diluent and a photo-initiator described in U.S. Pat. No. 4,472,491 the entire disclosure of this patent being incorporated herein by reference. Typical reactive diluent monomers include n- or iso-butyl acrylate, 2-ethylhexyl acrylate, N-vinylpyrrolidone, isodecyl acrylate and phenoxyethyl acrylate. Crosslinking agents, such as butanediol 1,4-diacrylate, hexanediol 1,6-diacrylate, trimethylolpropane tri(tetra)-acrylate, or pentaerythritol tri(tetra)-acrylate may be added. Photo-initiators, such as benzoin ether derivatives, thioxanthones and their derivatives, and also benzophenones, for example, Michler's ketone and acetophenone derivatives, can be used for initiating the curing process in ultraviolet light. Benzil dimethyl ketals, 2-hydroxy-2-methyl- 1-phenylpropan-1-one and substituted alpha-halogenoacetophenone can also be used. Further, tertiary alkanolamines can be used as additives to the UV hardeners.

Still another example of a radiation curable coating composition comprises a mixture of a siloxy-containing polycarbinol and an acrylated urethane or a siloxy-containing acrylated urethane with a multifunctional acrylate, and a free radical photo-initiator. These compositions are described in U.S. Pat. No. 4,477,548, the entire disclosure of this patent being incorporated herein by reference. The siloxy-containing acrylated urethane can be characterized as a compound having a siloxy-group-containing backbone on which at least one urethane moiety is formed at a reactive carbinal group position, which urethane moiety has at least one terminal ethylenic group typically provided by an acrylic functional group. The siloxy-containing acrylated urethane can be monomeric or oligomeric in character. For example, it may comprise a single siloxane group having one urethane moiety to which an acrylate group is attached. Alternatively, a polysiloxane can have one or more urethane moieties attached to several carbinol groups, each urethane moiety having one or more acrylate groups. The siloxy-containing acrylated urethane can be obtained by known methods, described, for example, in U.S. Pat. No. 4,130,708, the entire disclosure being incorporated herein by reference. These polycarbinols can be used in admixture with the acrylated urethanes or reacted with isocyanates and acrylate compounds to form the siloxy-containing acrylated urethane. Siloxy-containing polycarbinols are also known as organofunctional silicones having carbinol functionality. The siloxy-containing acrylated urethane can be prepared from any suitable polyisocyanate or mixture of such. Such compounds have at least two isocyanate groups. Typical polyisocyanates include ethylene diisocyanate, 1,2-diisocyanatopropane, 1,3-diisocyanatopropane, 1,6-diisocyanatohexane, 1,2-diisocyanatocyclohexane, 1,3-diisocyanatocyclohexane, 1,4-diisocyanatocyclohexane, diisocyanatobenzene, m-diisocyanatobenzene, p-diisocyanatobenzene, bis(4-isocyanatocyclohexyl)methane, bis(4-isocyanatophenyl)methane, toluene diisocyanate, 3,3'-dichloro-4,4'-diisocyanatobiphenyl, tris(4-isocyanatophenyl)-methane, 1,5-diisocyanatonaphthalene, hydrogenated toluene diisocyanate, 1-isocyanatomethyl-5-isocyanaato-1,3,3-trimethylcyclohexane, and 1,2,5-tris(6-isocyanatohexyl)biuret and polyisocyanates in a blocked form such as phenyl-blocked toluene diisocyanate and phenyl-blocked diisocyanatonaphthalene. The multifunctional acrylate is a compound having at least one functional group reactive with the polyisocyanate and at least one acrylic or methacrylic group which is available after the acrylate has reacted with the polyisocyanate. The group reactive with the polyisocyanate can be a hydroxyl group, and the acrylate compound can be a hydroxyl-containing acrylic ester. Esters that can be used include 2-hydroxyethyl acrylate, 2-hydroxypropyl acrylate, 3-hydroxypropyl acrylate 3-hydroxypropyl methacrylate, 2-hydroxyethyl methacrylate, 2-hydroxypropyl methacrylate, 3-hydroxybutyl acrylate, 1-methyl-2-hydroxyethyl methacrylate and the like. Any suitable acrylated urethane or mixtures of such can be used in the practice of this invention as long as each is readily crosslinked by suitable radiation. The use of a free radical photo-initiator renders these coating compositions radiation-curable. Two or more of such photo-initiators can be used if desired. A wide variety of free radical photo-initiators can be used as long as they do not deleteriously affect the desired properties of the resulting crosslinked protective overcoat while providing a sufficient cure rate. Photo-initiators are not necessary when curing is carried out with high energy electrons. Examples of typical free radical photo-initiators include alkyl benzoin ethers, such as benzoin ether; benzil; benzoin; benzophenone; benzophenone with an amine (e.g. triethylamine), such as methyldiethanol amine; dimethyl quinoxiline; 4,4'-bis(dimethylamino)benzophenone; acetophenones; such as 2,2-diethoxyacetophenone and t-butyl- alpha -trichloroacetophenone; and the like. Other photoinitiators include compounds as 3,4-bis(chloromethyl)benzophenone; 3,4-bis(chloromethyl)-4'-carbomethoxybenzophenone; 3,4-bis(chloromethyl)-4'-chlorobenzophenone; 3,4-bis(bromomethyl)benzophenone; 3,4-bis(dichloromethyl)benzophenone; 4,4'-bis(chloromethyl)benzophenone; 4,4'-bis(trichloromethyl)benzophenone; 4,4'-bis(dichloromonobromomethyl)benzophenone, 3,3-bis(1-chloroethyl)benzophenone; and the like. The proportions of each of the two reactive components and of the photoinitiator initiator in the curable coating compositions can be varied widely, as desired. Typically, where a mixture of siloxy-containing polycarbinol and acrylated urethane is used, the siloxy-containing polycarbinol can be present in an amount of from about 0.5 to about 10 percent, and preferably from about 1 to about 4 percent, based on total composition weight; and the acrylated urethane can be present in an amount of from about 4 to about 80 percent, and preferably from about 20 to about 40 percent, based on total composition weight. When a siloxy-containing acrylated urethane is used in the composition, it is typically present in an amount of from about 5 to about 80, and preferably of from about 20 to about 40 percent, based on total composition weight. Generally, the multifunctional acrylate can be present in the composition in an amount of from about 20 to about 95 percent, and preferably from about 40 to about 80 percent, based on total composition weight. The free radical photo-initiator or thermal initiator can be present typically in an amount of from about 0.1 to about 15 percent, and preferably from about 2 to about 8 percent, based on total composition weight. The optimum amounts to use in a particular instance will depend upon the particular compounds involved.

Still other radiation curable materials include cellulose nitrate, acrylated urethanes, acrylated polyesters, polyesters, vinylchloride/vinylacetate copolymers, polycarbonates, polyurethanes, epoxide resins, polyvinyl acetates, and the like. Specific examples of commercially available radiation curable materials include GAF 280AC, GAF 233, and GAF 245, available from General Aniline & film Corporation; 9505 and c-9503, available from P. D. George; and DESO-LITE 3380-78, available from D.S.M. Desotech Company. A preferred flexible seam coating comprises urethane acrylate copolymer.

If desired, minor amounts of any suitable additives such as plasticizers, colorants, wetting agents, fillers, and the like, may be added to the seam coating mixture. Generally, the amount of fillers is less than about 10 percent based on the weight of the final coating. The relative amount of the other additives is usually less than about 5 percent based on the weight of the final coating. If desired, the seam coating may contain an electrically conductive component. Typical electrically conductive components include graphite, metal particles such as gold, silver, copper, iron, aluminum, and the like. Since a welded seam normally does not normally discharge completely during image cycling, a seam coating that is electrically conductive minimizes the buildup of dry toner or liquid developer material deposits on the seam region which wastes toner and which can be a source of contamination for other machine components and subsystems such as optical lenses and corona wires. Alternatively, the seam coating composition may be electrically insulating.

For photoreceptor substrates that can tolerate high temperatures, the seam coating thermoplastic material may be applied as a powder coating, with the powder over the seam center being a thicker layer than the powder deposited at progressively greater distances from the center of the seam. Such powder may be liquefied subsequent to deposition by any suitable technique. Any suitable finely divided thermoplastic film forming polymer particles may be utilized including the thermoplastic seam coating polymers described above. Typical liquefying techniques include infrared heating, radio frequency heating, laser beam, conventional heating in an oven, and the like. Thus, the coating material may be in liquid or solid form at the time of application so long as it is liquefied at one point during the coating operation so that it can flow and form a coating having a relatively smooth outer surface which bridges the irregularities of the seam. For techniques such as radio frequency heating, the coating should contain an electrically conductive component. Typical electrically conductive components include metal particles such as graphite, metal particles such as gold, silver, copper, iron, aluminum, and the like. Generally, any nonthermoplastic particulate seam coating additive should have a particles size less than the thickness of the seam coating after hardening.

The hardenable curable coating composition can be applied by any suitable technique. Typical coating techniques include blade coating, roll coating, gravure coating, extrusion coating, wire wound coating rod coating and the like. A preferred coating technique involves application of the coating in a direction parallel to the length of the seam. The coating applicator surface may be of any suitable shape such as the flat or curved cross-sectional shapes and like as illustrated, for example, in FIGS. 2, 3, 4, 5 and 6.

The viscosity of the coating composition in its liquefied state can vary widely, depending on the particular method of coating chosen. Typically, satisfactory coatings can be readily formed on the seams from coating compositions having a viscosity in the range from about 25 to about 1000 centipoises, and more preferably in the range from about 75 to about 200 centipoises. The specific viscosity selection depends upon the coating application method employed.

The seam coating process of the present invention may be accomplished, for example, after the seam forming step is completed in the fabrication of belted photoreceptors. Preferably, the seam coating process is performed immediately following the seam forming process while the newly formed belted photoreceptor is still engaged in automated lap joint forming and handling equipment to minimize damage in intermediate handling steps. Because it is difficult to position the coating applicator precisely on the extreme edge of the welded seam every time for each coating operation, it is preferred that the coating applicator be lowered adjacent to the edge of the welded seam and then be moved slowly onto and directly over the welded seam. If desired, the coating applicator may be held stationary and the welded seam may be moved relative to the coating applicator or both coating applicator and welded seam may be moved relative to each other to effect traversal of the coating applicator along the welded seam. A typical coating applicator traverse rate over a stationary seam is between about 30 millimeters per second and about 70 millimeters per second. Radiation curing may be effected by a stationary radiation source or one that traverses the coated seam. A typical ultraviolet radiation curing traverse rate over the coated seam is between about 1 second per millimeter to about 2 seconds per millimeter.

For embodiments where the coating applicator moves during coating to provide relative motion between a moving or stationary photoreceptor, such movement may be accomplished by any suitable means such as a lead screw and ball arrangement, belt and pulley drive, or the like.

The thickness of the final hardened seam coatings should be sufficient to cover the surface irregularities created during welding of the belt seam. Satisfactory results can be achieved with thicknesses between about 5 micrometers and about 200 micrometers above the average outwardly facing surface of the seam at the seam centerline. The seam centerline is defined as the midpoint of the overlap interface of the web ends that were welded together. Preferably, the seam coating thickness is between about 20 micrometers and about 25 micrometers above the average surface of the seam at the seam centerline. Generally, when the seam coating thickness is less than about 5 micrometers, the coating will remain adhered to the seam when cycled around a 30 mm diameter roller due to its lower beam strength, but coverage of protrusions in the welded seam begins to deteriorate. When the seam coating thickness is greater than about 200 micrometers the beam strength of the coating begins to becomes so great that for even large diameter rollers a flat region is formed at the seam as the seam is carried around the periphery of rollers, and can cause delamination. Thus, relatively thick seam coatings should be utilized for cycling around larger diameter rollers. Thicker seam coatings may be utilized as long as the seam coating can be hardened and flexibility of the belt is not adversely affected. For example, when irradiation curing is utilized, seam thickness should allow sufficient applied radiant energy to penetrate the seam coating to the contiguous seam surface to cure substantially all of the seam coating material. The distance of the cured seam coating edge from the seam centerline may vary but should extend far enough from the seam centerline to cover the surface irregularities created during welding. Seam coating edge locations extending in a direction perpendicular to the seam centerline beyond the seam irregularities tend to reduce the total area of the outwardly facing belt surface available for imaging. However, where the weld irregularities are relatively high and narrow, wider seam coatings provide a more gradual ramp or slope for cleaning devices such as blades to slide over the seam. Generally, satisfactory results may be achieved with cured seam widths in which the distance of the cured seam coating edge from the seam centerline is between about 3 mm and about 8 mm.

For hot melt seam coatings, mere cooling of the applied coating by any suitable means, such as exposure to ambient air or forced air cooling, may be utilized. The curing of seam coating compositions may be accomplished by exposure to radiation such as ultraviolet light, electron beams, microwaves, X-rays, gamma rays, beta rays laser beams and the like which cause thermal heating or photochemical initiation of the curing process. High pressure mercury vapor lamps, for example, can be employed as the radiation source for the curing process by UV irradiation. A typical high intensity ultraviolet light source (e.g. 6 inch lamp, Type SD131, available from Fuson Systems) can be positioned at a various distances from the ultraviolet light curable coating for different cure rates [e.g. of about 20 cm (8 inches) for a period of about 5 seconds]. However, care should be taken prevent the light source from being so close that undesirable deformation of the belt occurs. Another example of a high intensity light source is one that operates at 200 Watts/in at a frequency of from 350 to 400 nm or one having an electrical output of 100 W/cm of luminous length. Typically, the radiation used should be of a sufficient intensity to penetrate substantially all the way through the coated layer. The total dosage employed should be sufficient to bring about curing of the radiation-curable coating composition to form a solid plastic.

Any suitable technique may be employed to heat a thermally curable seam coating composition. Typical heating processes include, infrared heating, laser heating, oven heating, forced air heating, and the like. Thermally curable seam coatings should be heated to a temperature sufficient to rapidly cure the coating. The temperature range used in curing thermal seam coating, defined herein as the "cure temperature", is at least at a temperature where the coating cures faster than at room temperature, is at least about 20° C. but below decomposition temperatures of the photoreceptor components, is below the temperature at which the belt components degrade or deteriorate, and is sufficiently high to achieve satisfactory cure rate of the seam coating layer. Thus, for example a cure temperature from about 50° to about 300° C., and preferably from 100° C. to about 250° C. is satisfactory at ambient atmospheric pressure. The use of reduced pressure conditions in the coating and curing process provides for a substantial reduction in the temperatures required for successful cure. The curable film forming seam coating compositions of this invention should be substantially completely convertible to a solid product and should be free of volatile solvents or diluents during the curing step. Furthermore, the curable film forming seam coating compositions of this invention should undergo little or no shrinkage upon curing.

The following describes one specific embodiment for coating a welded belt photoreceptor seam for use with dry toner or liquid ink. A 100 percent solids radiation curable strip of liquid or powder is applied over the length of the seam. Application can be accomplished, for example, by spray coating; blade coating; or gravure roll coating. The coating is next cured by placing it beneath an irradiation curing source for a suitable period of time. Alternatively, the irradiation curing source may be passed over a stationary photoreceptor seam. The coating is almost instantaneously cured, forming a tough, smooth and flexible coating having a uniformly smooth seam that does not distort the photoreceptor due to minimal shrinkage of the coating film. The photoreceptor surface, other than the seam and immediately adjacent areas, is preferably shielded during the curing step to prevent stray irradiation curing light from inducing damage such as fatigue to the imaging portion of the photoreceptor.

In yet another embodiment of the process of the present invention, a thin polymer coating, typically about 20 micrometers to 500 micrometers thick is formed on the seam of a preformed belted photoreceptor and the coating is irradiated with a laser beam typically for about 1 to 2 seconds. The coated belt may be cooled, if desired.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A flexible photoreceptor belt was formed from web of polyester film (Mylar, available from E. I. duPont de Nemours and Co.) having a width of about 33.5 cm, a length of about 59 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. The belt was formed by overlapping about 0.9 mm of the opposite ends of the belt to form a seam, placing the seam on an anvil, and welding the seam with a traversing ultrasonic welding horn. This belt was cycled in a xerographic imaging test device. The test device comprised a 3 roll belt support structure in which one roll had a diameter of 19 mm. A polyurethane doctor blade was used to clean the photoreceptor imaging surface. The uncoated welded seamed belt was periodically examined during cycling for any cracks, crevasses, flaps, scratches, nicks, dislocations and the like formed by separation of the weld splash material from the belt substrate. The uncoated seamed belt was considered unacceptable when separation of the outer splash material from the belt substrate exceeded a total distance of 35 mm in length. The seamed area was viewed with the aid of a microscope. Delamination changed the color of the outer splash material to a lighter shade of brown which was discernible along the length of the welded seam. It was found that the average number of cycles to the point of unacceptable performance was less than the life of the disposable cartridge in which the belt was to be employed. Moreover, examination of the cleaning blade after 7,500 cycles showed the formation of pits or grooves which adversely affected the quality of belt cleaning compared to a cleaning blade having a smooth continuous edge.

EXAMPLE II

A seamed belt identical to the one described in Example I was placed on a supporting surface with the welded seam facing upwardly. A 100 percent solids ultraviolet radiation curable strip of urethane acrylate liquid (DESOLITE 3380-78, available from D.S.M. Desotech Company) was applied over the length of the seam by a blade coating system similar to the arrangement illustrated in FIG. 6. The welded seam of the belt was centered belt over a groove machined in a flat metal support. The groove had a width of about 12 mm and was machined to a depth of about 1 mm by a tool having a cutting radius of about 60 mm. About 5 mm of the belt on each side of the seam conformed to the machined vacuum groove to form a trough after the vacuum was applied to the groove though apertures positioned in the wall of the groove. Sufficient radiation curable urethane acrylate liquid was extruded into the trough to fill the trough. A polyurethane squeegee blade was then passed over the material in the trough to force the coating material to conform to the shape of the trough. The wet thickness of the coating over the centerline of the welded seam was about 30 micrometers. The distance of each edge of the wet coating from the centerline of the welded seam was about 5 mm the edges of the coating was feathered due to the geometry of the vacuum groove. The coating was cured in the trough by placing it beneath a high intensity ultraviolet light source (6 inch lamp, Type SD131, available from Fuson Systems) at a distance of about 20 cm (8 inches) for a period of about 5 seconds. The photoreceptor was shielded with an aluminum light mask during the curing cycle to prevent stray ultraviolet light from inducing fatigue damage to the imaging portion of the photoreceptor. The coating was substantially instantaneously cured, while in the trough, forming a tough, smooth and flexible coating having a uniformly smooth seam due to minimal shrinkage of the coating film. All of the protrusions in the welded seam were covered by the cured coating.

EXAMPLE III

The coated seamed belt prepared by the seam coating process described in Example II was repeated except that the seam coating material was cured after the coated belt was removed from the groove and placed on a flat surface. The coating was cured by placing it beneath a high intensity ultraviolet light source (6 inch lamp, Type SD131, available from Fuson Systems) at a distance of about 20 cm (8 inches) for a period of about 5 seconds. The photoreceptor was shielded with an aluminum light mask during the curing cycle to prevent stray ultraviolet light from inducing fatigue damage to the imaging portion of the photoreceptor. The coating was substantially instantaneously cured, forming a tough, smooth and flexible coating having a uniformly smooth seam due to minimal shrinkage of the coating film. All of the protrusions in the welded seam were covered by the cured coating.

EXAMPLE IV

The coated seamed belt prepared by the seam coating process described in Example II was rapidly cycled to make copies in the same manner as that described in Example I. The coated welded seamed belt was periodically examined during cycling for any cracks, crevasses, flaps, scratches, nicks, dislocations and the like formed by separation of the weld splash material from the belt substrate. The uncoated seamed belt was considered unacceptable when separation of the outer splash material from the belt substrate exceeded a total distance of 35 mm in length. The seamed area was viewed with the aid of a microscope. Delamination changed the color of the outer splash material to a lighter shade of brown which was discernible along the length of the welded seam. It was found that the average number of cycles to the point of unacceptable performance was about 10,000 cycles. The life of the coated seamed belts prepared by the process of this invention was almost 33 percent greater than that of the prior art control process described in Example I. Moreover, examination of the cleaning blade after 10,000 cycles showed no wear. This represents a marked improvement over the blade life of Example I.

EXAMPLE V

A flexible photoreceptor identical to the one described in Example I was placed on the flat surface of a table with the imaging surface facing upwardly. A metal mask stencil consisting of about 0.076 mm (0.03 inch) thick stainless steel was placed between the photoreceptor seam surface and an air brush spray coating nozzle in an arrangement similar to that illustrated in FIG. 5. The distance between the seam and the mask was about 10 min. The distance between the mask and the tip of the air brush nozzle was about 40 mm. The opening of the stencil had a width of about 10 mm and a length of about 35 cm. A 100 percent solids ultraviolet radiation curable strip of urethane acrylate liquid (DESOLITE 3380-78, available from D.S.M. Desotech Company) was thinned down with 60 percent by weight methylene chloride in order to atomize it through the air brush. The coating was applied over the length of the seam by the air brush at a rate of about 15 cm (6 inches) per second. After three passes, the mask distance from web was increased to about 30 mm and one additional coating pass was made over the seam to feather the seam coating edge and form a gently sloped ramp for the cleaning blade. The volatile methylene chloride flashed off during the spray coating process and the deposited liquid coating was substantially free of any residual methylene chloride thinner. The wet thickness of the deposited coating over the centerline of the welded seam was about 15 micrometers. The distance of each edge of the wet coating from the centerline of the welded seam was about 8 mm. The coating was cured by placing it beneath a high intensity ultraviolet light source (6 inch lamp, Type SD131, available from Fuson Systems) at a distance of about 20 cm (8 inches) for a period of about 5 seconds. The photoreceptor was shielded with an aluminum light shield during the curing cycle to prevent stray ultraviolet light from inducing fatigue damage to the imaging portion of the photoreceptor. The coating was substantially instantaneously cured, forming a tough, smooth and flexible coating having a uniformly smooth seam due to minimal shrinkage of the coating film. All of the protrusions in the welded seam were covered by the cured coating.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process for coating flexible belt welded lap joint seams comprising providing a rectangular flexible web comprising a thermoplastic substrate and at least one imaging layer having an outer imaging surface, overlapping opposite ends of said web to form an overlapped seam, ultrasonically welding the overlapping ends together to form a flexible belt having an outwardly facing imaging surface and a welded lap joint seam, bending said belt in the shape of a trough with said welded lap joint seam at the bottom of said trough, filing said trough with a liquid coating to cover said welded lap joint, to form a coating strip having feathered edges and a thickness between about 5 micrometers and about 200 micrometers above the average surface of said welded lap joint seam at the centerline of said welded lap joint seam, said liquid coating comprising a hardenable film forming polymer substantially free of fugitive solvent, the outer surface of said imaging layer having a surface energy exceeding the surface energy of said hardenable film forming polymer by at least about 30 percent based on the surface energy of said hardenable film forming polymer, and hardening said hardenable film forming polymer to form a smooth solid coating strip on said welded lap joint seam.

2. A process for coating according to claim 1 including supplying a partial vacuum through apertures in the bottom of said trough to draw said belt into said trough thereby bending said belt in the shape of said trough.

3. A process for coating according to claim 1 including drawing a doctor blade over said imaging surface in a direction parallel to said centerline of said welded lap joint after filing said trough with said liquid coating to level said liquid coating.

4. A process for coating flexible belt welded lap joint seams comprising providing a rectangular flexible web comprising a thermoplastic substrate and at least one imaging layer having an outer imaging surface, overlapping opposite ends of said web to form an overlapped seam having an overlap of between about 0.7 millimeter and about 1.5 millimeters, ultrasonically welding the overlapped ends together to form a flexible belt having an outwardly facing imaging surface and a welded lap joint seam, bending said belt in the shape of a trough with said welded lap joint seam at the bottom of said trough, filing said trough with a liquid coating comprising a hardenable film forming polymer to form a smooth liquid coating covering said welded lap joint seam, said coating being substantially free of fugitive solvent and having feathered edges and a thickness between about 5 micrometers and about 200 micrometers above the average surface of said welded lap joint seam at the centerline of said welded lap joint seam, said outer imaging surface of said imaging layer having a surface energy exceeding the surface energy of said hardenable film forming polymer by at least about 30 percent based on the surface energy of said hardenable film forming polymer, and hardening said coating to form a smooth solid coating strip on said welded lap joint seam, the distance of each edge of said solid coating strip from the centerline of said welded lap joint seam being between about 3 mm and about 8 mm.

* * * * *